United States Patent [19]

Pignal

[11] 4,145,596
[45] Mar. 20, 1979

[54] METHOD AND DEVICE FOR THE AUTOMATIC INTRODUCTION OF STUDS INTO THE ELECTRODE OF A WELDING MACHINE

[75] Inventor: Edmond L. Pignal, Sciez, France

[73] Assignee: Societe Anonyme dite: Societe des Fabrications Biraghi-Entrepose, Paris, France

[21] Appl. No.: 729,410

[22] Filed: Oct. 4, 1976

[30] Foreign Application Priority Data

Oct. 8, 1975 [FR] France .................... 75 30837

[51] Int. Cl.² .................... B23K 9/20; B23K 9/12
[52] U.S. Cl. .................... 219/98; 219/99; 414/741
[58] Field of Search .................... 219/98, 99; 214/147 T, 214/1 BD

[56] References Cited

U.S. PATENT DOCUMENTS

| 959,456 | 5/1910 | Capbell | 214/1 BD X |
| 2,001,814 | 5/1935 | Buckminster | 214/1 BC |
| 2,580,472 | 1/1952 | Smith | 214/147 T |
| 2,868,240 | 1/1959 | Roeber | 214/1 BD |
| 3,233,752 | 2/1966 | Lagler | 214/1 BD |

OTHER PUBLICATIONS

Automatic Stud Welding at the Works of Leyland Motors in Machinery, 3/65, pp. 590 & 591.

*Primary Examiner*—E. A. Goldberg
*Attorney, Agent, or Firm*—Fulwider, Patton, Rieber, Lee & Utecht

[57] ABSTRACT

The apparatus for the automatic introduction of the members to the electrode of a resistance welding machine comprises an arm mounted on the machine frame so as to pivot about a horizontal pin located at the intersection of the horizontal hollow electrode axis and the vertical of the end of the slide for supplying the members to be welded, at least one jack for controlling the rotation of said arm, a finger mounted at the end of the arm so as to slide radially and coupled to at least one control jack integral with the arm, and a gripper mounted at the end of said finger and having two jaws which move under the action of at least one jack.

A particular application of the invention is to the fitting of studs to heat exchanger tubes.

2 Claims, 4 Drawing Figures

METHOD AND DEVICE FOR THE AUTOMATIC INTRODUCTION OF STUDS INTO THE ELECTRODE OF A WELDING MACHINE

BACKGROUND OF THE INVENTION

It is known that the manufacture of certain heat exchanger tubes comprises the fitting on the outer periphery thereof of elongated cylindrical members, called studs. These members are preferably resistance welded after being placed in the hollow electrode of a welding machine.

According to a preferred construction method, the studs have a head whose diameter is slightly greater than that of the body and which constitutes the support area for the hollow electrode and also the only area through which current passes. Due to the presence of the head, the studs must be introduced from the front into the electrode, but this hitherto manual operation is relatively protracted and involves risks for personnel having to supply the welding electrode.

BRIEF SUMMARY OF THE INVENTION

Therefore, the present invention has for its object a method for the automatic introduction of studs into the horizontal hollow electrode of a machine permitting the resistance welding of studs to a tube.

According to the invention, each member to be welded is brought into a vertical position at the end of a slide, after which the said member is arrested and the slide is raised, followed by the rotation of the member to be welded by about 90° to bring it into the hollow electrode axis and finally said member is introduced into the electrode.

The invention also has for its object an apparatus for performing this method.

BRIEF DESCRIPTION OF THE DRAWINGS

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made if desired, by those skilled in the art, without departing from the invention and the scope of the appended claims. In the drawings show:

DETAILED DESCRIPTION OF THE PREFERRED EMBODIMENTS

Figure 1:
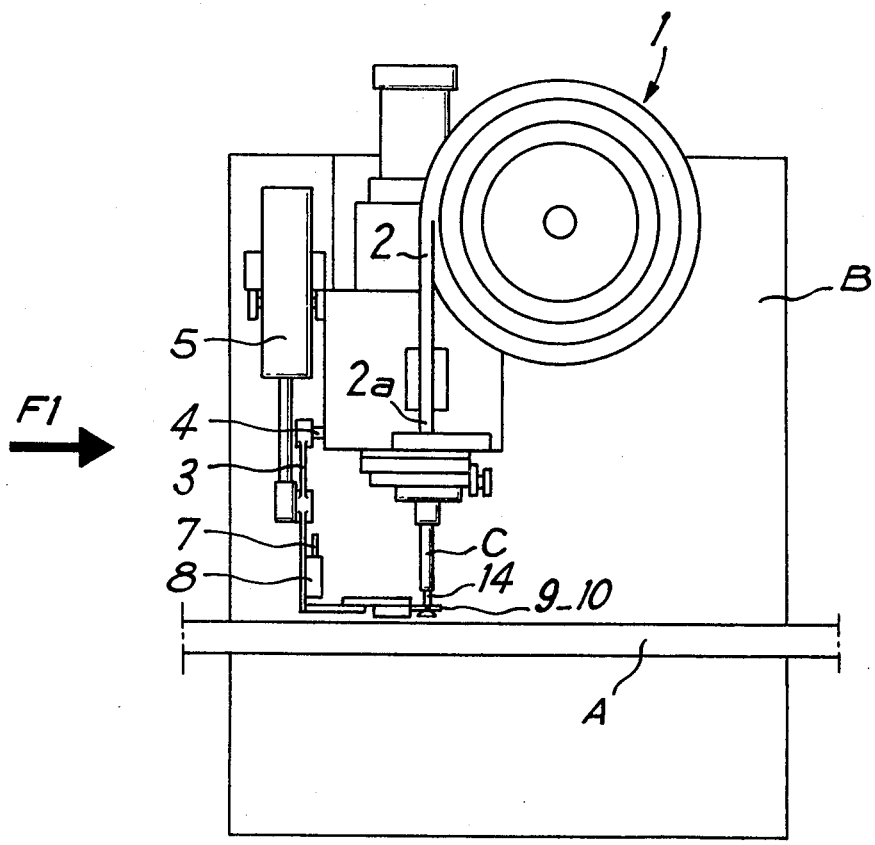
FIG. 1 a schematic plan view of an apparatus according to the invention.

Referring to FIG. 1, it is possible to see a tube A defining the axis of the welding machine and which substantially comprises a carriage, schematically represented by the reference letter B. This carriage supports a horizontal hollow electrode C and can move in accordance with an appropriate cycle parallel to the axis of tube A. The apparatus according to the invention is also mounted on carriage B.

It comprises a "vibrating bowl" 1 equipped with a slide 2. In said bowl are provided the studs and in known manner the vibrations make it possible for them to move along the slide 2 in which they are vertically suspended by their head. Thus, the studs arrive at the end 2a of the slide where their advance is stopped by a retractable stop member, not shown in the drawing.

An arm 3 is mounted so as to pivot about a pin 4 substantially located at the intersection of the horizontal axis of the electrode and vertical of the end 2a of the slide. Its rotation between a substantially horizontal position (represented by a continuous line in FIG. 2), corresponding to the charging of a stud into electrode C and a substantially vertical position (represented by a dotted line) corresponding to the engagement of the stud located at the end 2a of the slide is ensured by a double-acting hydraulic or pneumatic jack 5, articulated to carriage B and coupled to arm 3.

Figure 3:
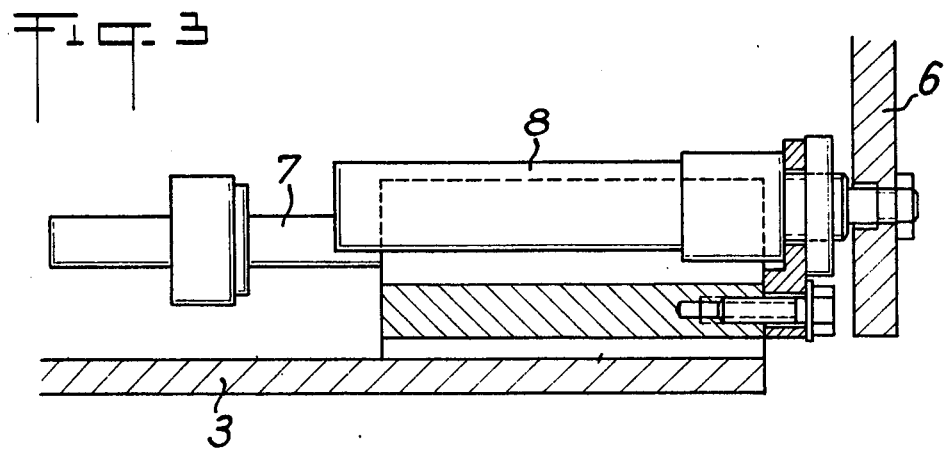
FIG. 3 a section along the lines III—III of FIG. 2.

At the end of arm 3 is provided a finger, which slides substantially in accordance with the axis of the arm between two end positions. In practice, this finger, more particularly visible in FIG. 3, comprises a plate 6 fixed to the end of a rod 7 which slides in an appropriate slide mounted on the arm. A double-acting hydraulic or pneumatic jack 8 is also fixed to the arm and its movable member is coupled to plate 6.

Figure 4:
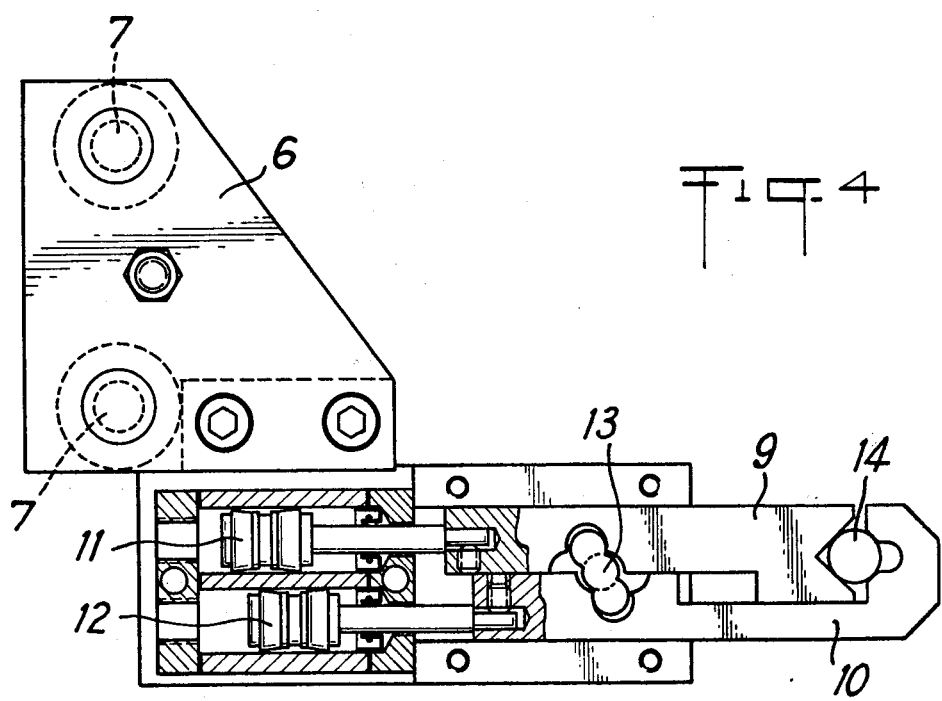
FIG. 4 a view, with tearing away, following the arrow $F_2$ of FIG. 2.

Finally, the finger supports a gripper serving to arrest the studs, being more specifically visible in FIG. 4. This gripper comprises two jaws 9 and 10 which slide relative to one another and relative to plate 6, parallel to the plane of the latter and more specifically parallel to the pivot pin 4 of arm 3.

Each jaw 9 and 10 is coupled to a preferably single-acting hydraulic or pneumatic jack 11, 12. The synchronisation of the movement of the jaws is obtained by means of a rocking lever 13 pivoting in plate 6 and cooperating by its two ends with the corresponding recesses in each jaw.

The ends of the two jaws 9 and 10 are appropriately shaped so as to grip round a stud 14, visible more particularly in FIG. 4.

A not shown programmer controls the sequential operation of the different jacks to ensure the operation to be defined hereinafter.

Figure 2:
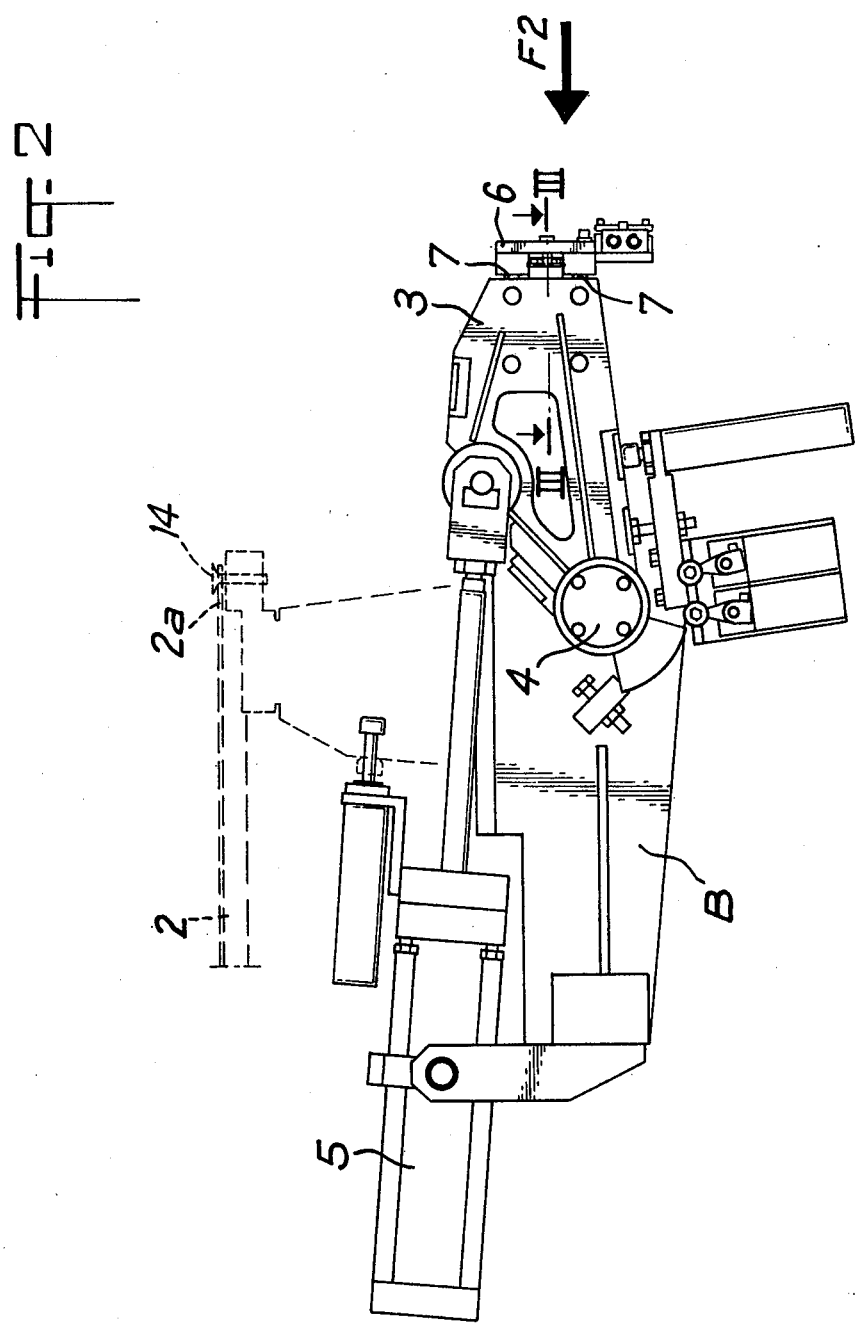
FIG. 2 an elevation and side view of the apparatus, following the arrow $F_1$ of FIG. 1.

In its position shown in FIG. 2 of the drawing by a continuous line, the apparatus introduces stud 14 into electrode C.

The jack 12 is energised and pulls the jaw 10 which drives jaw 9 via the pivoting rocking lever 13. The gripper is then opened.

Jack 8 is supplied in the direction of the extension and can remove plate 6 and the gripper located thereon from electrode C, thus disengaging it from the end of stud 14.

Nothing now opposes the pivoting of arm 3 so that it arrives in its substantially vertical position and, to this end, jack 5 is supplied in the retraction direction.

When the gripper is perpendicular to the end 2a of slide 2 and to the stud located there, jack 11 is actuated and jaws 9 and 10 simultaneously move together, thus closing the gripper over the stud to remove the same.

A further rotation of arm 3 towards its horizontal position is ensured by jack 5 and the stud located in the gripper is brought into the axis of the horizontal electrode C after escaping from the retractable stop member of end 2a of the slide.

A retraction movement of jack 8 controls the movement of plate 6 and of the grippers which it supports in the direction of the pivot pin 4, thus causing the fitting of the new stud within the hollow electrode C.

This lead back to the start of the cycle described hereinbefore and a new identical cycle can take place.

During each cycle of arm 3, its finger and the gripper, the electrode fitted with a stud is advanced in the direction of the tube to effect the stud welding operation.

Obviously, the programming of the cycle of arm 3, its finger and the gripper can be realised by any appropriate electrical electromechanical or electronic means. This type of programming is well known to the skilled Experts and the output signals thereof control the supply valves for the jacks 5, 8, 11 and 12, in such a way that no further description thereof is necessary.

It is merely pointed out that it can either have end of travel contact, such as are shown in the drawings, or timing and safety devices so that the movement of one of the jacks is not controlled until the movement of the previously controlled jack has been completed.

Obviously, the invention is not limited to the embodiment described and represented hereinbefore, but in fact covers all variants thereof. In particular, the invention can be applied to machines having two or more welding electrodes, whereby a stud supply apparatus is associated with each electrode or alternatively can ensure the simultaneous supply of two electrodes located on the same side of the carriage, relative to the axis of the tube to be studded. In the latter case it is advantageous to provide two stud grippers at the end of the finger, whereby said two grippers, identical to the gripper described hereinbefore, extend in two opposite directions relative to the plane of the arm carrying the same.

What is claimed is:

1. Apparatus for successively automatically feeding a horizontal hollow electrode of a stud welding machine having a frame that supports said electrode with a plurality of elongated cylindrical studs, said apparatus comprising:
   a vertical stud feeding slide fixed to said frame above said electrode to successively position said studs for transfer to said electrode;
   an arm pivotally mounted on said frame for movement about a horizontal axis located at the intersection of vertical projection of a stud positioned in said slide and the horizontal axis of said electrode;
   a jack for controlling the rotation of said arm;
   a finger slidably mounted at the end of said arm with respect to said electrode;
   a second jack carried by said arm coupled to said finger in order to extend and retract said finger with respect to said arm; and
   a gripper mounted on said slidable finger and having two jaws movable towards and away from a stud to be fed into said electrode.

2. A method for successively automatically feeding a horizontally disposed hollow electrode of a stud welding machine with a plurality of studs which are to be radially welded on a horizontal tube wherein each stud is brought and momentarily stopped in a vertically disposed position on the end of a feeding slide of said machine located above and rearwardly of said electrode, gripping said stud and removing it from said slide, rotating said stud through a vertical plane containing said slide and said electrode substantially along a quadrant, said stud being maintained in a radial direction with respect to said quadrant to be disposed in a horizontal orientation in front of said hollow electrode, and finally introducing said stud horizontally into said electrode.

* * * * *